United States Patent
Ma

(10) Patent No.: US 7,066,438 B2
(45) Date of Patent: Jun. 27, 2006

(54) COLLAPSIBLE SUPPORTING DEVICE FOR A PORTABLE COMPUTER

(75) Inventor: Chan-Min Ma, Taipei (TW)

(73) Assignee: Delta Design Group Co., Ltd., Tortola (VG)

( * ) Notice: Subject to any disclaimer, the term of this patent is extended or adjusted under 35 U.S.C. 154(b) by 247 days.

(21) Appl. No.: 10/712,922

(22) Filed: Nov. 13, 2003

(65) Prior Publication Data

US 2005/0029415 A1    Feb. 10, 2005

(30) Foreign Application Priority Data

Aug. 5, 2003    (CN)    ................................ 03 1 53018

(51) Int. Cl.
   *A47B 97/04* (2006.01)
(52) U.S. Cl. ...................... 248/448; 248/166
(58) Field of Classification Search ................ 248/448,
   248/449, 460, 462, 464, 465, 463, 444, 165,
   248/166, 167, 434, 168, 170, 440, 917, 918
   See application file for complete search history.

(56) References Cited

U.S. PATENT DOCUMENTS

| 2,464,031 | A | * | 3/1949 | Fiedel ........................ 248/167 |
| 2,522,345 | A | * | 9/1950 | Cashiopp .................... 248/121 |
| 3,417,954 | A | * | 12/1968 | Croninger ................... 248/462 |
| 3,984,074 | A | * | 10/1976 | Forman et al. ............. 248/451 |
| 4,050,658 | A | * | 9/1977 | Forman et al. ............. 248/464 |
| 4,943,021 | A | * | 7/1990 | Cien et al. .................. 248/167 |
| 5,112,020 | A |   | 5/1992 | Ginsberg .................... 248/456 |
| 5,129,616 | A | * | 7/1992 | Carson ........................ 248/457 |
| 5,381,707 | A |   | 1/1995 | Gill .............................. 74/546 |
| 5,505,413 | A | * | 4/1996 | Hennessey .................. 248/166 |
| 5,511,758 | A | * | 4/1996 | Hsu ............................ 248/461 |
| 5,624,097 | A | * | 4/1997 | Potter ......................... 248/464 |
| 5,660,117 | A | * | 8/1997 | Noble ........................... 108/35 |
| 5,720,465 | A | * | 2/1998 | Peltzer et al. ............... 248/453 |
| 5,915,661 | A |   | 6/1999 | Silverman et al. ........ 248/465.1 |
| 6,017,012 | A | * | 1/2000 | Henson, Jr. ................. 248/460 |
| 6,098,952 | A | * | 8/2000 | Tonn ........................... 248/688 |
| D436,465  | S | * | 1/2001 | Berkman ..................... D6/466 |
| 6,215,054 | B1 |  | 4/2001 | Woodhouse et al. .......... 84/421 |
| 6,283,421 | B1 | * | 9/2001 | Eason et al. ................. 248/170 |
| 6,305,653 | B1 |  | 10/2001 | Oldham et al. .......... 248/177.1 |
| 6,412,742 | B1 | * | 7/2002 | Yu ............................... 248/434 |
| 2003/0001065 | A1 | * | 1/2003 | Ng ............................... 248/460 |

* cited by examiner

*Primary Examiner*—Robert P. Olszewski
*Assistant Examiner*—A. Joseph Wujciak
(74) *Attorney, Agent, or Firm*—Ladas & Parry LLP

(57) ABSTRACT

In a collapsible supporting device for a portable computer, a pair of base members and a pair of interconnecting members are connected pivotally to a coupling seat. A pair of supporting members are coupled to the interconnecting members, respectively. The supporting device is operable to move from a folded position, where the base members and the interconnecting members are disposed parallel to each other, to a supporting position, where the interconnecting members are disposed between the base members, where a stopping block on each base member abuts against a front portion of the computer, where a desired angle is formed between the interconnecting members, and where each supporting member is disposed uprightly and has an abutting end disposed higher than that of each base member and abutting against a rear portion of the computer.

13 Claims, 6 Drawing Sheets

COLLAPSIBLE SUPPORTING DEVICE FOR A PORTABLE COMPUTER

CROSS-REFERENCE TO RELATED APPLICATION

This application claims priority of Chinese Application No. 03153018.4, filed on Aug. 5, 2003.

BACKGROUND OF THE INVENTION

1. Field of the Invention

The invention relates to a supporting device, more particularly to a collapsible supporting device for a portable computer.

2. Description of the Related Art

Generally, a portable computer is disposed directly on a table surface during use, which results in a poor heat-dissipating efficiency. Furthermore, it is not ergonomical for a user to operate a portable computer that is disposed directly on a table surface.

Therefore, the object of the present invention is to provide a collapsible supporting device for a portable computer that can enable the portable computer to be ergonomically operated and to have a superior heat-dissipating efficiency.

SUMMARY OF THE INVENTION

According to the present invention, there is provided a collapsible supporting device for a portable computer. The portable computer has opposite front and rear portions. The supporting device comprises:

a coupling seat having a surface, and first and second end portions opposite in a direction;

a pair of elongate base members, each of which has a first pivot end connected pivotally to a corresponding one of the first and second end portions of the coupling seat, and a first abutting end opposite to the first pivot end, the base members being pivotable relative to the coupling seat about first and second axes transverse to the surface of the coupling seat, respectively, the first abutting end of each of the base members being formed with a stopping block;

a pair of elongate interconnecting members, each of which has a second pivot end connected pivotally to a corresponding one of the first and second end portions of the coupling seat, and a coupling end opposite to the second pivot end, the interconnecting members being pivotable relative to the coupling seat about third and fourth axes transverse to the surface of the coupling seat, respectively; and a pair of elongate supporting members, each of which is coupled to the coupling end of a corresponding one of the interconnecting members and has opposite second abutting ends.

The supporting device is operable so as to move from a folded position, where the base members and the interconnecting members are disposed parallel to each other, to a first supporting position, where the interconnecting members are disposed between the base members, where the stopping block on the first abutting end of each of the base members is adapted to abut against the front portion of the portable computer, where a desired angle is formed between the interconnecting members, and where the supporting members are disposed uprightly such that one of the second abutting ends of each of the supporting members is disposed at a location higher than that of the first abutting end of each of the base members and is adapted to abut against the rear portion of the portable computer.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
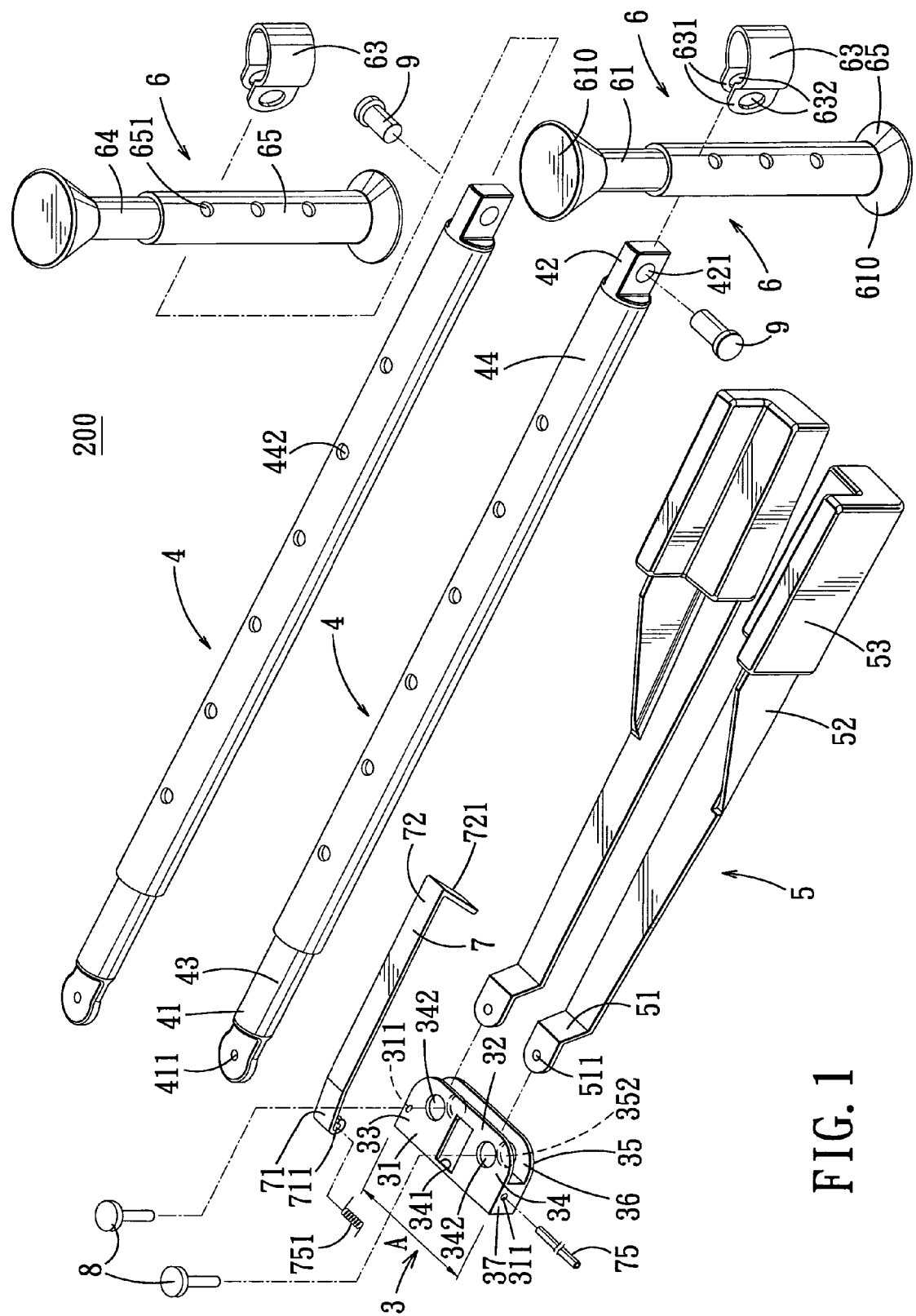
FIG. 1 is an exploded perspective view showing the preferred embodiment of a collapsible supporting device for a portable computer according to the present invention.

FIGS. 1 to 4 illustrate the preferred embodiment of a collapsible supporting device 200 for a portable computer 900 according to the present invention. The portable computer 900 has opposite front and rear portions 901, 902. The supporting device 200 includes a coupling seat 3, a pair of elongate base members 5, a pair of elongate interconnecting members 4, and a pair of elongate supporting members 6.

The coupling seat 3 has a surface 31, and first and second end portions 33, 34 opposite in a direction (A). In this embodiment, the coupling seat 3 has opposite upper and lower walls 32, 35 disposed spacedly apart from each other, and a connecting block 37 interconnecting the upper and lower walls 32, 35 and cooperating with the upper and lower walls 32, 35 so as to confine a mounting space 36. The upper wall 32 has the surface 31.

Figure 2:
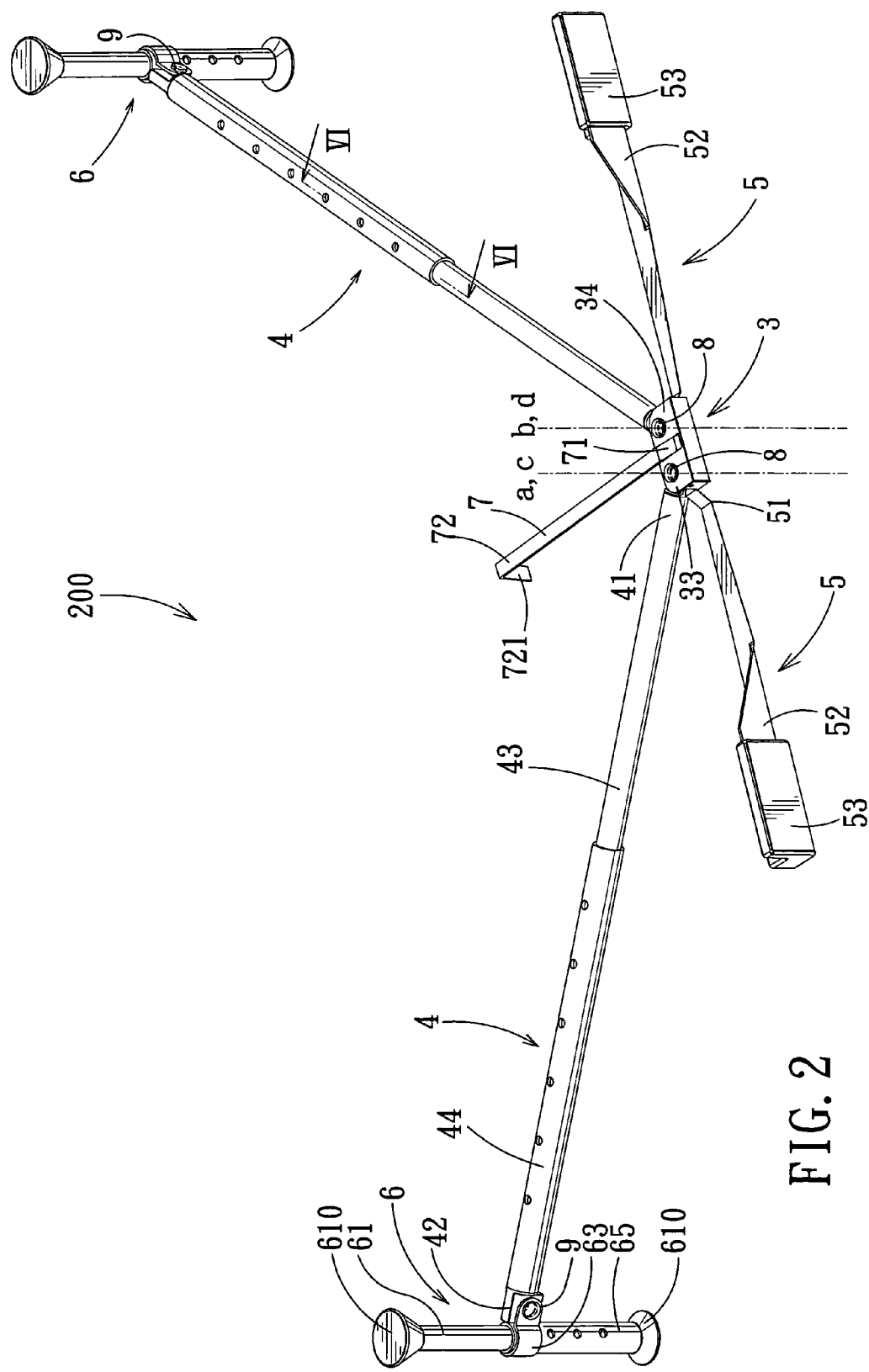
FIG. 2 is a perspective view showing the preferred embodiment when the supporting device is disposed in a first supporting position.

Each base member 5, which is formed from a metal plate, has a first pivot end 51 received in the mounting space 36 in the coupling seat 3 and connected pivotally to a corresponding one of the first and second end portions 33, 34 of the coupling seat 3, and a first abutting end 52 opposite to the first pivot end 51. The base members 5 are pivotable relative to the coupling seat 3 about first and second axes (a, b) transverse to the surface 31 of the upper wall 32 of the coupling seat 3, respectively, as shown in FIG. 2. The first abutting end 52 of each base member 5 is formed with a L-shaped stopping block 53.

Figure 6:
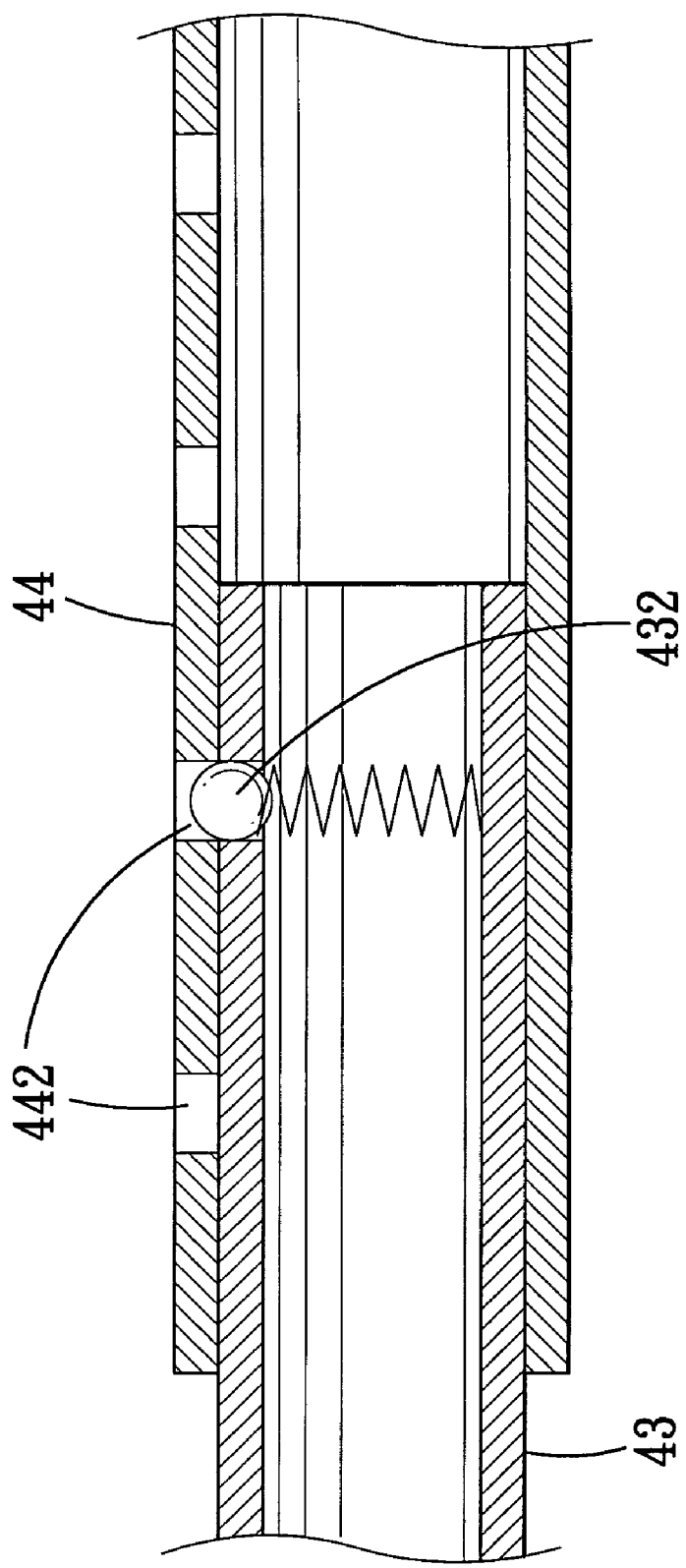
FIG. 6 is a fragmentary schematic sectional view of an interconnecting member of the preferred embodiment, taken along line VI—VI in FIG. 2.

Each interconnecting member 4 has a second pivot end 41 received in the mounting space 36 in the coupling seat 3 and connected pivotally to a corresponding one of the first and second end portion 33, 34 of the coupling seat 3, and a coupling end 42 opposite to the second pivot end 41. The interconnecting members 4 are pivotable relative to the coupling seat 3 about third and fourth axes (c, d) transverse to the surface 31 of the upper wall 32 of the coupling seat 3, respectively, as shown in FIG. 2. In this embodiment, the first and second axes (a, b) are coaxial with the third and fourth axes (c, d) (see FIG. 2). As such, the first pivot end 51 of each base member 5 and the second pivot end 41 of each interconnecting member 4 can be connected pivotally to the corresponding one of the first and second end portions 33, 34 of the coupling seat 3 by means of a respective rivet 8 extending through a mounting hole 342 in the upper wall 32, a pivot hole 411 in the second pivot end 41 of the interconnecting member 4, a pivot hole 511 in the first pivot end 51 of the base member 4, and a mounting hole 352 in the lower wall 35 of the coupling seat 3. Each interconnecting member 4 of this embodiment is a telescopic member that includes an inner tube 43 and an outer tube 44. The inner tube 43 has the second pivot end 41, and is mounted with a spring-loaded positioning ball 432, as shown in FIG. 6. The outer tube 44 is formed with a set of positioning holes 442 disposed spacedly apart from each other in an axial direction. The inner tube 43 is operable so as to enable the positioning ball 432 to engage a selected one of the positioning holes 442 in the outer tube 44, as shown in FIG. 6.

Each supporting member 6 is coupled to the coupling end 42 of a corresponding one of the interconnecting members 4, and has opposite second abutting ends 61, each of which is provided with an anti-slip pad 610. In this embodiment, each supporting member 6, which is a telescopic member having a configuration similar to those of the interconnecting members 4, includes an inner tube 64 having said one of the second abutting ends 61, and an outer tube 65 sleeved mounted on the inner tube 64 and having the other one of the second abutting ends 61. The inner tube 64 is mounted with a spring-loaded positioning ball (not shown). The outer tube 65 is formed with a set of positioning holes 651 disposed spacedly apart from each other in an axial direction. The inner tube 64 is operable so as to enable the positioning ball to engage a selected one of the positioning holes 651 in the outer tube 65. Each supporting member 6 of this embodiment further includes a C-shaped ring 63 sleeved on the outer tube 65. The C-shaped ring 63 has opposite lug ends 631 connected pivotally to the coupling end 42 of the corresponding one of the interconnecting members 4 by means of a rivet 9 extending through a mounting hole 632 in one of the lug ends 631 of the C-shaped ring 63, a pivot hole 421 in the coupling end 42 of the interconnecting member 4, and a mounting hole 632 in the other one of the lug ends 631 of the C-shaped ring 63 such that each supporting member 6 is pivotable relative to the coupling end 42 of the corresponding one of the interconnecting members 4.

Figure 3:
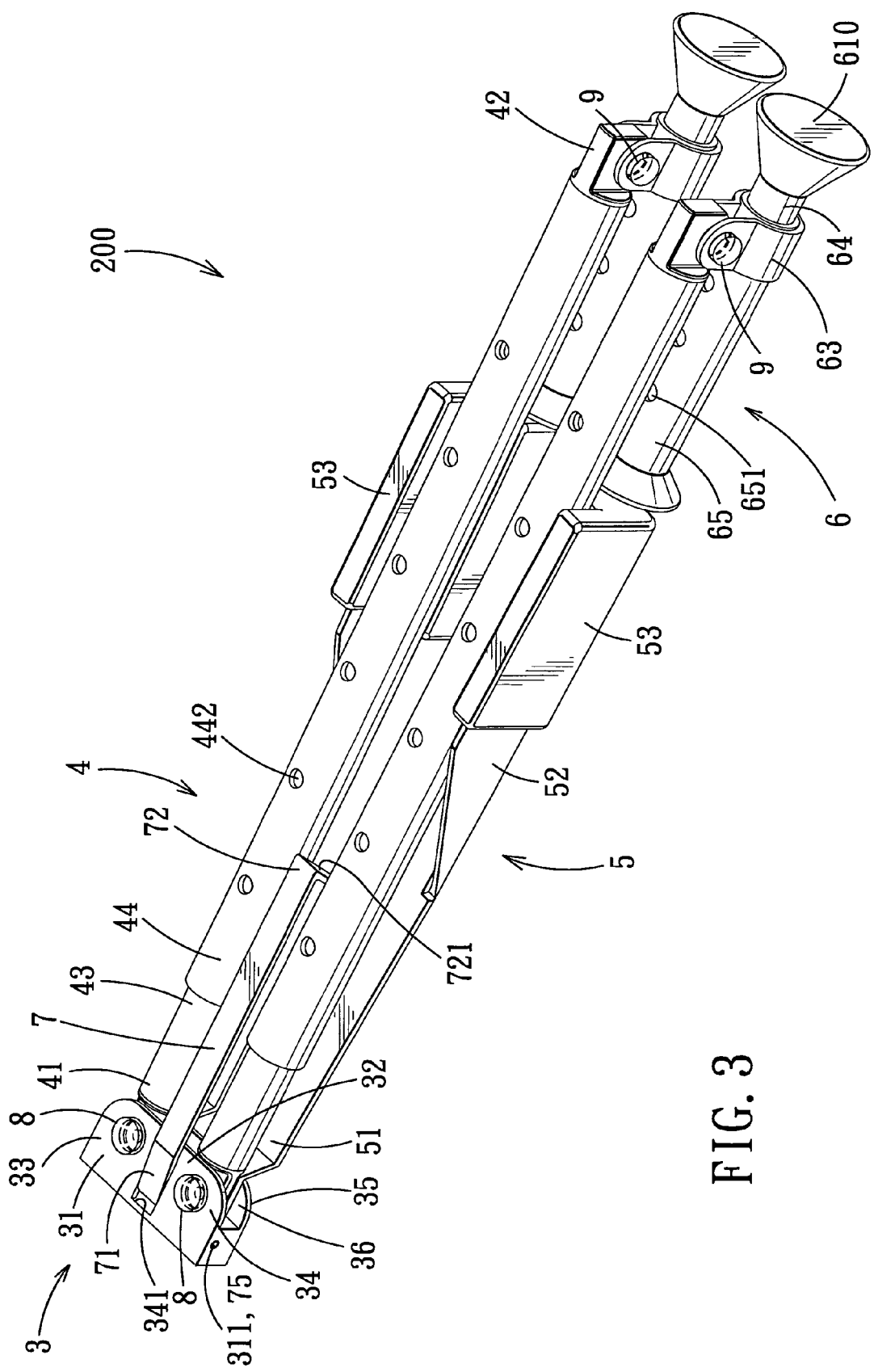
FIG. 3 is a perspective view showing the preferred embodiment when the supporting device is disposed in a folded position.
Figure 4:
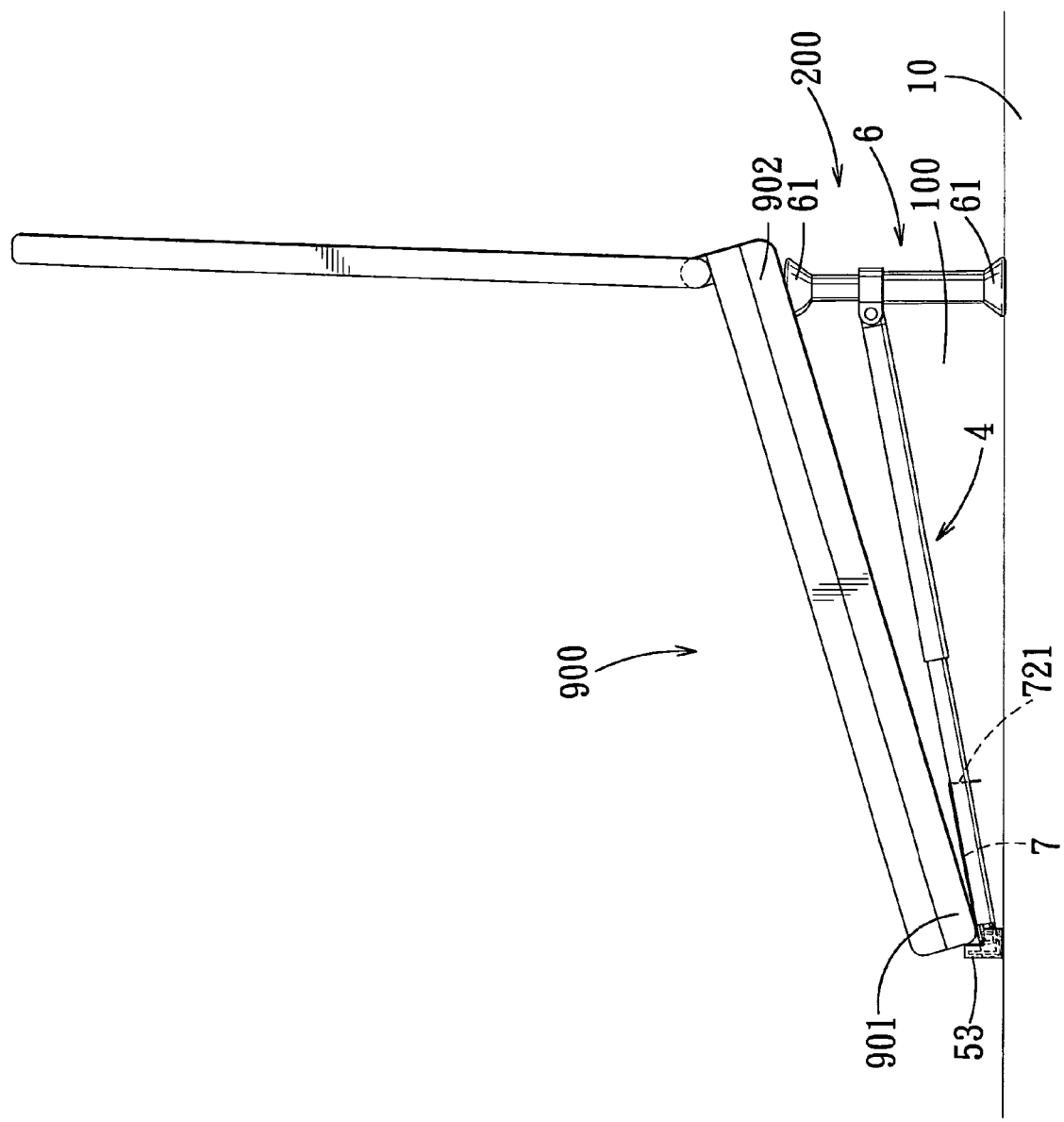
FIG. 4 is a schematic side view showing the preferred embodiment when the supporting device is disposed in the first supporting position for supporting the portable computer thereon.

In actual use, the supporting device 200 is operable so as to move from a folded position, where the base members 5 and the interconnecting members 4 are disposed parallel to each other and where the base members 5 are disposed under the interconnecting members 4, respectively, as shown in FIG. 3, to a first supporting position, where the interconnecting members 4 are disposed between the base members 5, where the stopping block 53 on the first abutting end 52 of each base member 5 is adapted to abut against the front portion 901 of the portable computer 900, where a desired angle is formed between the interconnecting member 4, and where the supporting members 6 are disposed uprightly such that one of the second abutting ends 61 of each supporting member 6 is disposed at a location higher than that of the first abutting end 52 of each base member 5 and is adapted to abut against the rear portion 902 of the portable computer 900, as shown in FIG. 4.

In view of the above configuration, the inner tube 43 of each interconnecting member 4 is operable so as to enable the positioning ball 432 to engage a selected one of the positioning holes 442 in the outer tube 44 of the interconnecting member 4 such that each interconnecting member 4 is adjusted to have a desired length when the supporting device 200 is disposed in the first supporting position. Additionally, the inner tube 64 of the supporting member 6 is operable so as to enable the positioning ball to engage a selected one of the positioning holes 651 in the outer tube 65 of the supporting member 6 such that each supporting member 6 is adjusted to a desired height when the supporting device 200 is disposed in the first supporting position. Therefore, the supporting device 200 of the present invention is suitable for supporting portable computers 900 with various sizes. Furthermore, since the rear portion 902 of the portable computer 900 is supported by the supporting device 200 at a location higher than the front portion 901 so as to form a heat-dissipating space between the portable computer 900 and a plane 10 on which the supporting device 200 is disposed, the portable computer 900 can thus be ergonomically operated and has a superior heat-dissipating efficiency.

Figure 5:
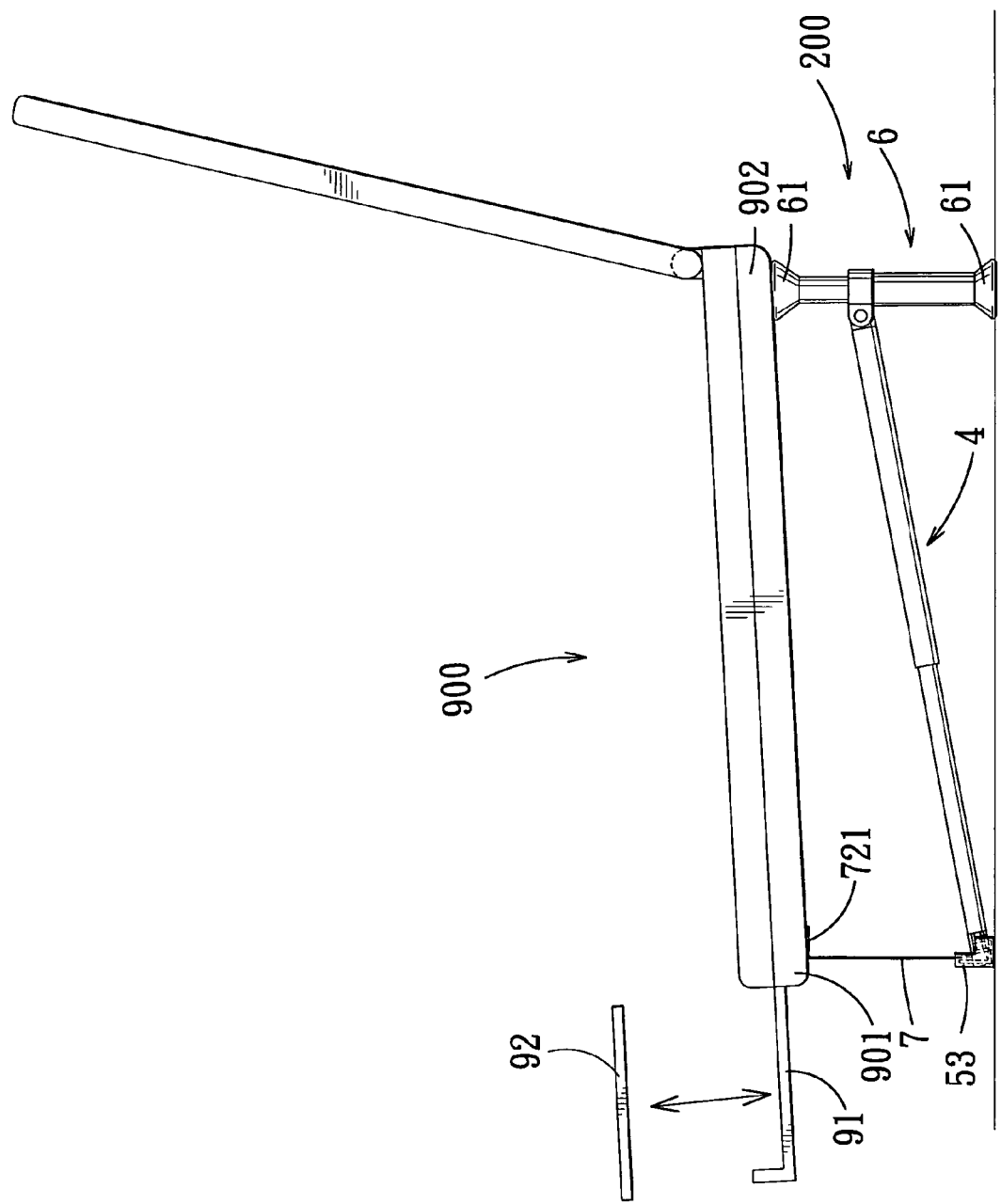
FIG. 5 is a schematic side view showing the preferred embodiment when the supporting device is disposed in a second supporting position for supporting the portable computer thereon.

The supporting device 200 further includes an auxiliary supporting member 7 that has a third pivot end 71 connected pivotally to the coupling seat 3, and a third abutting end 72 opposite to the third pivot end 71. The auxiliary supporting member 7 is movable from a collapsed position to an extended position so as to enable the supporting device 200 to move from the first supporting position to a second supporting position, where the auxiliary supporting member 7 extends transverse to the surface 31 of the upper wall 32 of the coupling seat 3, where the third abutting end 72 of the auxiliary supporting member 7 is adapted to abut against the front portion 901 of the portable computer 900, and where said one of the second abutting ends 61 of each supporting member 6 is adapted to abut against the rear portion 902 of the portable computer 900, such that the portable computer 900 is suspended above the coupling seat 3, as shown in FIG. 5. In this embodiment, the third pivot end 71 of the auxiliary supporting member 7 is formed with a pivot groove 711. The coupling seat 3 further has a pivot rod 75 extending along the direction (A) and extending through a through hole 311 in the connecting block 37 and the pivot groove 711 such that the third pivot end 75 is rotatable relative to the coupling seat 3 about the pivot rod 75. The auxiliary supporting member 7 further has a spring 751 sleeved on the pivot rod 75, received in the pivot groove 711, and biasing the auxiliary supporting member 7 to the collapsed position. The third abutting end 72 of the auxiliary supporting member 7 is formed with a flange 721 that is adapted to contact the front portion 901 of the portable computer 900 when the supporting device 200 is disposed in the second supporting position, as shown in FIG. 5. As such, for the portable computer 900 mounted with an optical disc carriage 91 in the front portion 901, replacement of a disc 92 can be easily conducted when the portable computer 900 is supported by the supporting device 200 in the second supporting position.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangement.

I claim:

1. A collapsible supporting device for a portable computer, the portable computer having opposite front and rear portions, said supporting device comprising:
a coupling seat having a surface, and first and second end portions opposite in a direction;
a pair of elongate base members, each of which has a first pivot end connected pivotally to a corresponding one of said first and second end portions of said coupling seat, and a first abutting end opposite to said first pivot end, said base members being pivotable relative to said coupling seat about first and second axes transverse to said surface of said coupling seat, respectively, said first abutting end of each of said base members being formed with a stopping block;
a pair of elongate interconnecting members, each of which is a telescopic member that has a second pivot end connected pivotally to a corresponding one of said first and second end portions of said coupling seat, and a coupling end opposite to said second pivot end, said interconnecting members being pivotable relative to said coupling seat about third and fourth axes that are transverse to said surface of said coupling seat, respectively, and that are coaxial with said first and second axes, respectively; and
a pair of elongate supporting members, each of which is coupled to said coupling end of a corresponding one of said interconnecting members and has opposite second abutting ends;
said supporting device being operable so as to move from a folded position, where said base members are disposed parallel to and under said interconnecting members, respectively, to a first supporting position, where said interconnecting members are disposed between said base members, where said stopping block on said first abutting end of each of said base members is adapted to abut against the front portion of the portable computer, where a desired angle is formed between said interconnecting members, and where said supporting members are disposed uprightly such that one of said second abutting ends of each of said supporting members is disposed at a location higher than that of said first abutting end of each of said base members and is adapted to abut against the rear portion of the portable computer.

2. The collapsible supporting device as claimed in claim 1, wherein said coupling seat has opposite upper and lower walls disposed spacedly apart from each other, and a connecting block interconnecting said upper and lower walls and cooperating with said upper and lower walls so as to confine a mounting space for receiving said first pivot ends of said base members and said second pivot ends of said interconnecting members, said upper wall having said surface.

3. The collapsible supporting device as claimed in claim 1, wherein each of said interconnecting members includes an inner tube having said second pivot end, and an outer tube sleeved movably on said inner tube and having said coupling end.

4. The collapsible supporting device as claimed in claim 3, wherein said inner tube is mounted with a spring-loaded positioning ball, said outer tube being formed with a set of positioning holes disposed spacedly apart from each other in an axial direction, said inner tube being operable so as to enable said positioning ball to engage a selected one of said positioning holes in said outer tube such that each of said interconnecting members is adjusted to have a desired length when said supporting device is disposed in the first supporting position.

5. The collapsible supporting device as claimed in claim 1, wherein each of said second abutting ends of each of said supporting members is provided with an anti-slip pad.

6. The supporting device as claimed in claim 1, wherein each of said supporting members is a telescopic member.

7. The collapsible supporting device as claimed in claim 1, wherein each of said supporting members includes an inner tube having said one of said second abutting ends, and an outer tube sleeved movably on said inner tube and having the other one of said second abutting ends.

8. The collapsible supporting device as claimed in claim 7, wherein said inner tube is mounted with a spring-loaded positioning ball, said outer tube being formed with a set of positioning holes disposed spacedly apart from each other in an axial direction, said inner tube being operable so as to enable said positioning ball to engage a selected one of said positioning holes in said outer tube such that each of said supporting members is adjusted to have a desired height when said supporting device is disposed in the first supporting position.

9. The collapsible supporting device as claimed in claim 1, wherein each of said base members is formed from a metal plate.

10. The collapsible supporting device as claimed in claim 1, further comprising an auxiliary supporting member that has a third pivot end connected pivotally to said coupling seat, and a third abutting end opposite to said third pivot end, said auxiliary supporting member being movable from a collapsed position to an extended position so as to enable said supporting device to move from the first supporting position to a second supporting position, where said auxiliary supporting member extends transverse to said surface of said coupling seat, where said third abutting end of said auxiliary supporting member is adapted to abut against the front portion of the portable computer, and where said one of said second abutting ends of each of said supporting members is adapted to abut against the rear portion of the portable computer, such that the portable computer is suspended above said coupling seat.

11. The collapsible supporting device as claimed in claim 10, wherein said third pivot end of said auxiliary supporting member is formed with a pivot groove, said coupling seat further having a pivot rod extending along the direction and extending through said pivot groove such that said third pivot end is rotatable relative to said coupling seat about said pivot rod.

12. The collapsible supporting device as claimed in claim 11, wherein said auxiliary supporting member further has a spring sleeved on said pivot rod, received in said pivot groove, and biasing said auxiliary supporting member to the collapsed position.

13. The collapsible supporting device as claimed in claim 10, wherein said third abutting end of said auxiliary supporting member is formed with a flange that is adapted to contact the front portion of the portable computer when said supporting device is disposed in the second supporting position.

* * * * *